Nov. 26, 1940.    G. H. CARLSON    2,222,605
APPARATUS FOR ASSEMBLING ANTIFRICTION BEARINGS
Filed Jan. 2, 1937    5 Sheets-Sheet 1

INVENTOR
George H. Carlson
By Parker, Carlson, Pitzner & Hubbard
ATTORNEYS

Nov. 26, 1940.  G. H. CARLSON  2,222,605
APPARATUS FOR ASSEMBLING ANTIFRICTION BEARINGS
Filed Jan. 2, 1937  5 Sheets-Sheet 2
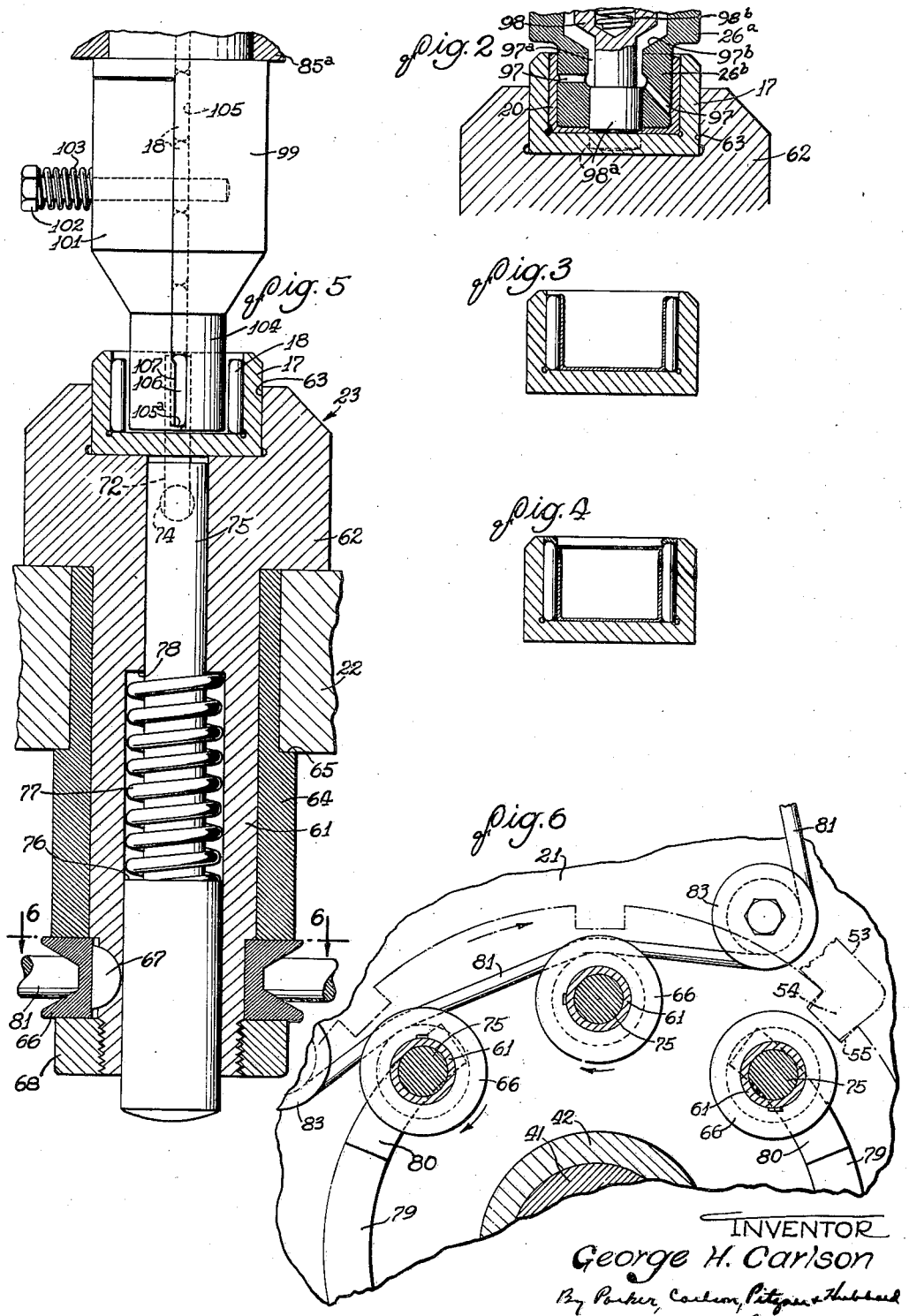

Nov. 26, 1940.   G. H. CARLSON   2,222,605
APPARATUS FOR ASSEMBLING ANTIFRICTION BEARINGS
Filed Jan. 2, 1937   5 Sheets-Sheet 3
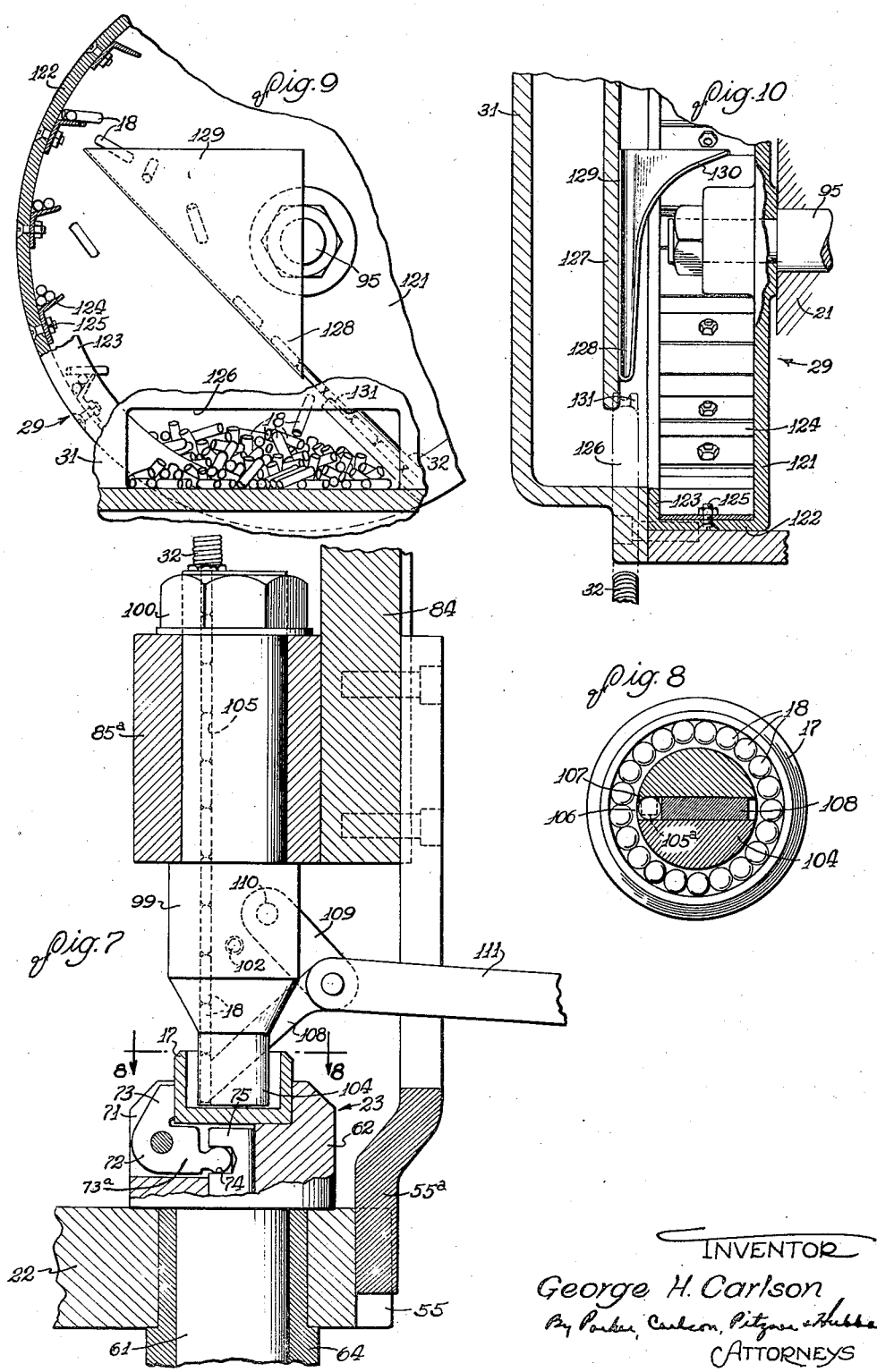
INVENTOR
George H. Carlson
By Parker, Carlson, Pitzner & Hubbard
ATTORNEYS Nov. 26, 1940.  G. H. CARLSON  2,222,605
APPARATUS FOR ASSEMBLING ANTIFRICTION BEARINGS
Filed Jan. 2, 1937   5 Sheets-Sheet 4
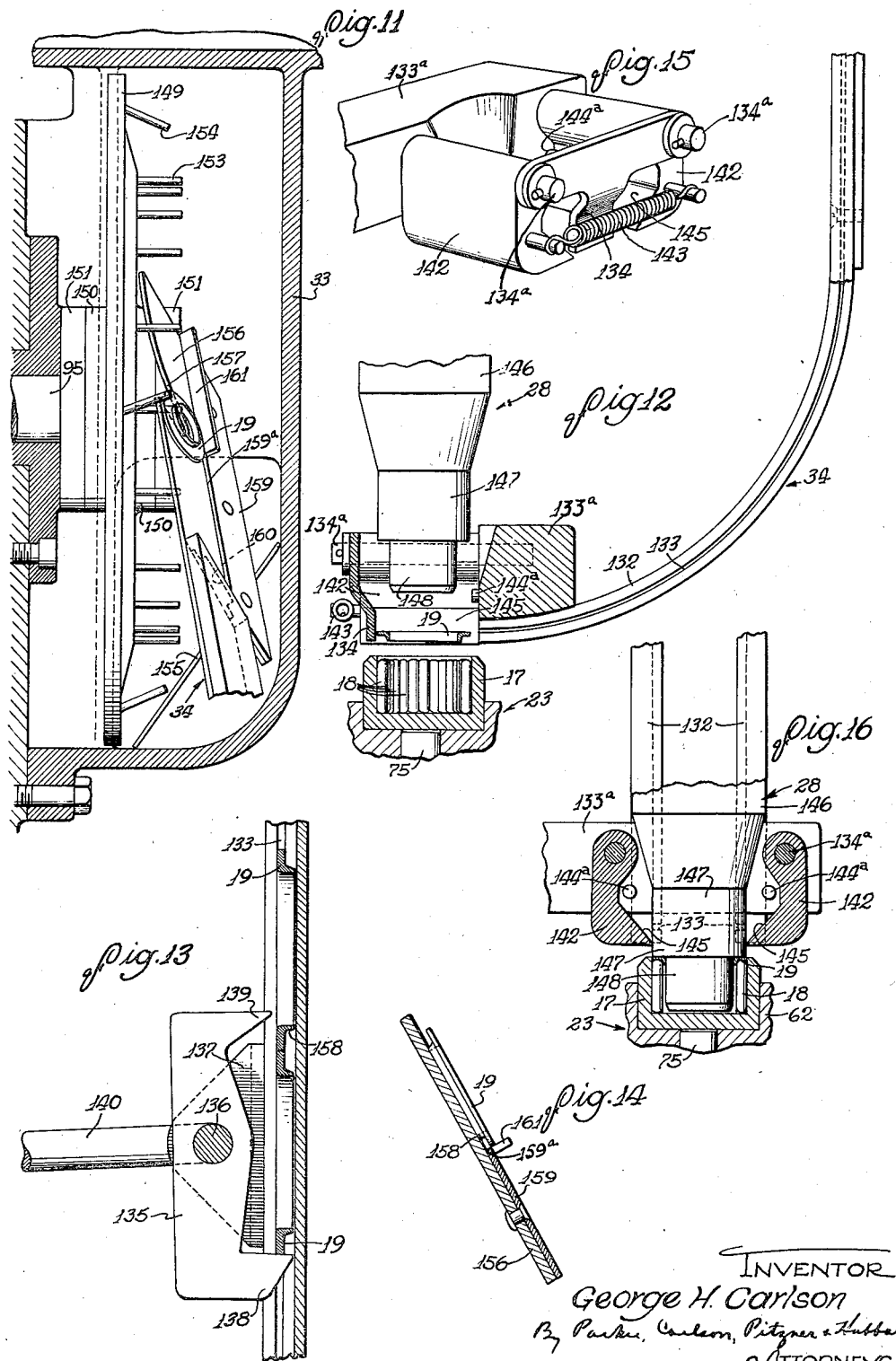
INVENTOR
George H. Carlson
By Parker, Carlson, Pitzner & Hubbard
ATTORNEYS Nov. 26, 1940.  G. H. CARLSON  2,222,605
APPARATUS FOR ASSEMBLING ANTIFRICTION BEARINGS
Filed Jan. 2, 1937  5 Sheets-Sheet 5
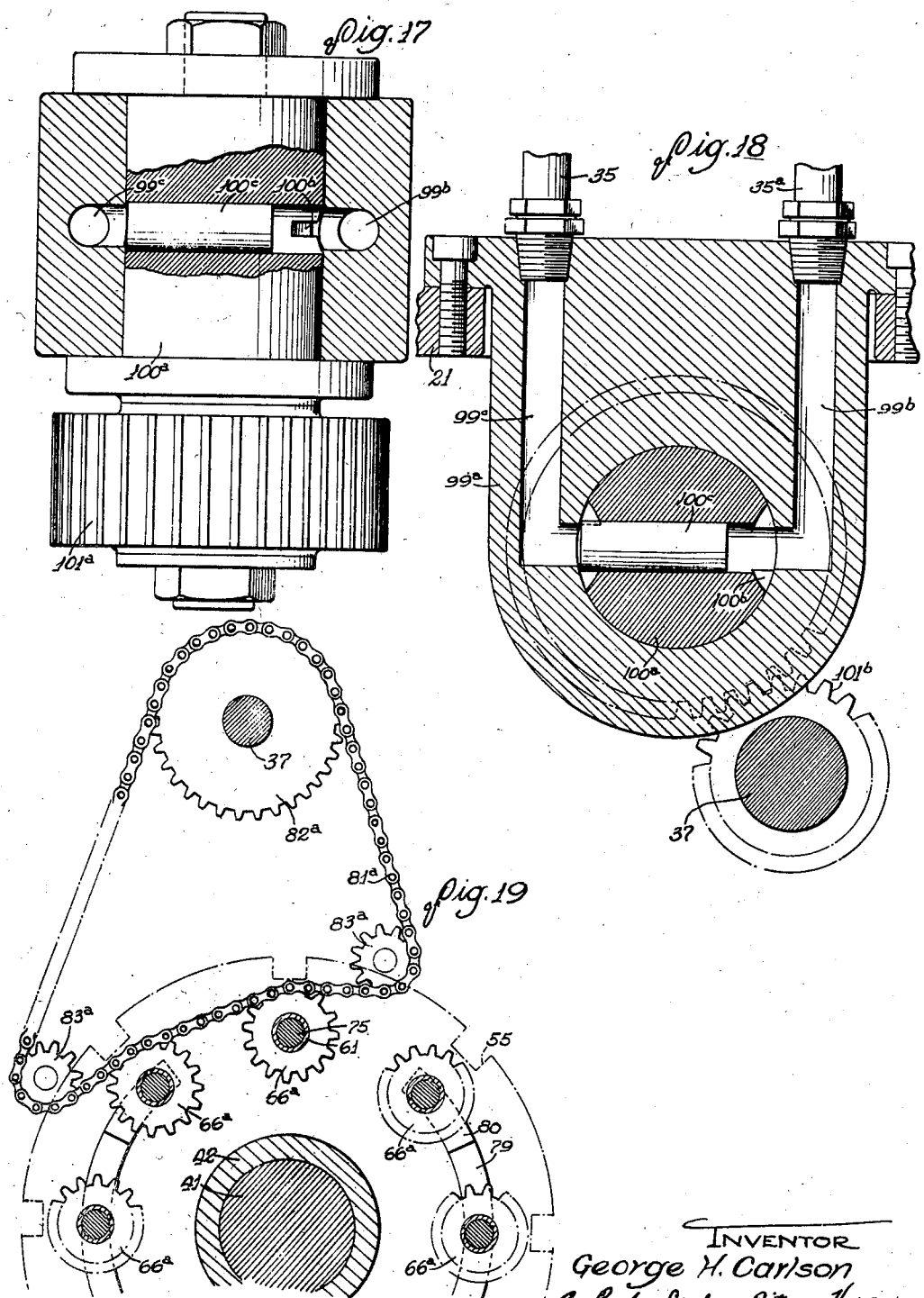

Patented Nov. 26, 1940

2,222,605

UNITED STATES PATENT OFFICE 2,222,605

APPARATUS FOR ASSEMBLING ANTI-FRICTION BEARINGS

George H. Carlson, Rockford, Ill., assignor to Ekstrom, Carlson & Co., Rockford, Ill., a corporation of Illinois Application January 2, 1937, Serial No. 118,727

5 Claims. (Cl. 29—84)

This invention relates to the assembly of antifriction bearings and the general object is to provide a novel and improved apparatus by which the component parts of such bearings may be assembled rapidly and efficiently into complete bearing units ready for application to the rotating parts with which they are to be used.

The invention is particularly adapted although not limited to the assembly of roller bearings of the full series cageless type. These consist generally of an outer race having an internal cylindrical surface around which a plurality of bearing elements, usually in the form of plain cylindrical rollers, are arranged in side-by-side contact. The rollers may be held against axial movement by means of an annular retaining member or ring secured to the race. Heretofore, it has been the practice in assembling bearings of this character to arrange the rollers in a circular series on a mandrel and then insert the assembled series in the race. The retaining ring is then set in place by a separate operation. This method of assembly is relatively slow and, moreover, requires substantially constant supervision as well as numerous manual operations which materially increase assembly costs. These disadvantages are effectually avoided by the improved assembly method contemplated by the present invention wherein the rollers are inserted in the race individually and automatically assembled in a series within the race.

A more specific object of the invention is to provide a novel mechanism for feeding the rollers axially one-by-one into the race, shifting the rollers radially into engagement with the cylindrical wall thereof and simultaneously effecting relative angular movement between the race and the roller feeding means.

Another object is to provide an improved machine for assembling cageless roller bearings which has a high productive capacity and which is adapted to carry out the various assembling operations automatically.

Another object is to provide an improved mechanism for inserting bearing elements directly in a race including means reciprocable within the race for shifting the inserted elements radially to position them against the wall of the race.

Another object is to provide an improved mechanism for ejecting a series of bearing elements from an inserting fixture into a race including drive mechanism of an advantageous character adapted to operate without injury to the elements or the mechanism in case the outlet of the fixture is temporarily blocked by a previously ejected element.

Other objects and advantages of the invention will become apparent from the following detailed description taken in connection with the accompanying drawings, in which:

Figure 1 is a perspective view of a machine for carrying out the improved method of assembling roller bearings.

Figs. 2, 3, and 4 are sectional views of a roller bearing in various stages of assembly.

Fig. 5 shows a carrier unit in section and the roller inserting unit in elevation.

Fig. 6 is a view taken along the line 6—6 of Fig. 5 showing the mechanism for driving the carrier units during certain of the assembling operations.

Fig. 7 is a fragmentary side view, partly in section, of the roller inserting unit and a carrier unit.

Fig. 8 is a sectional view taken along the line 8—8 of Fig. 7.

Fig. 9 is a fragmentary elevational view of the roller feed mechanism.

Fig. 10 is a fragmentary transverse sectional view of the mechanism shown in Fig. 9.

Fig. 11 is a view, partly in section, showing part of the retaining ring feed mechanism.

Fig. 12 is a view of another part of the retaining ring feed mechanism.

Fig. 13 is a detail view, partly in section, showing the mechanism for controlling the delivery of retaining rings to the assembling station.

Fig. 14 is a detail view in section of the arrangement for ejecting improperly oriented retaining rings from the feed mechanism.

Fig. 15 is a perspective view of the delivery end of the retaining ring feed chute.

Fig. 16 is a transverse sectional view of the mechanism shown in Fig. 15 showing the manner in which the retaining rings are inserted in the bearing races.

Figs. 17 and 18 are detail views of the metering mechanism forming a part of the grease injecting unit.

Fig. 19 is a plan view showing a modified mechanism for driving the carriers.

Figure 1:
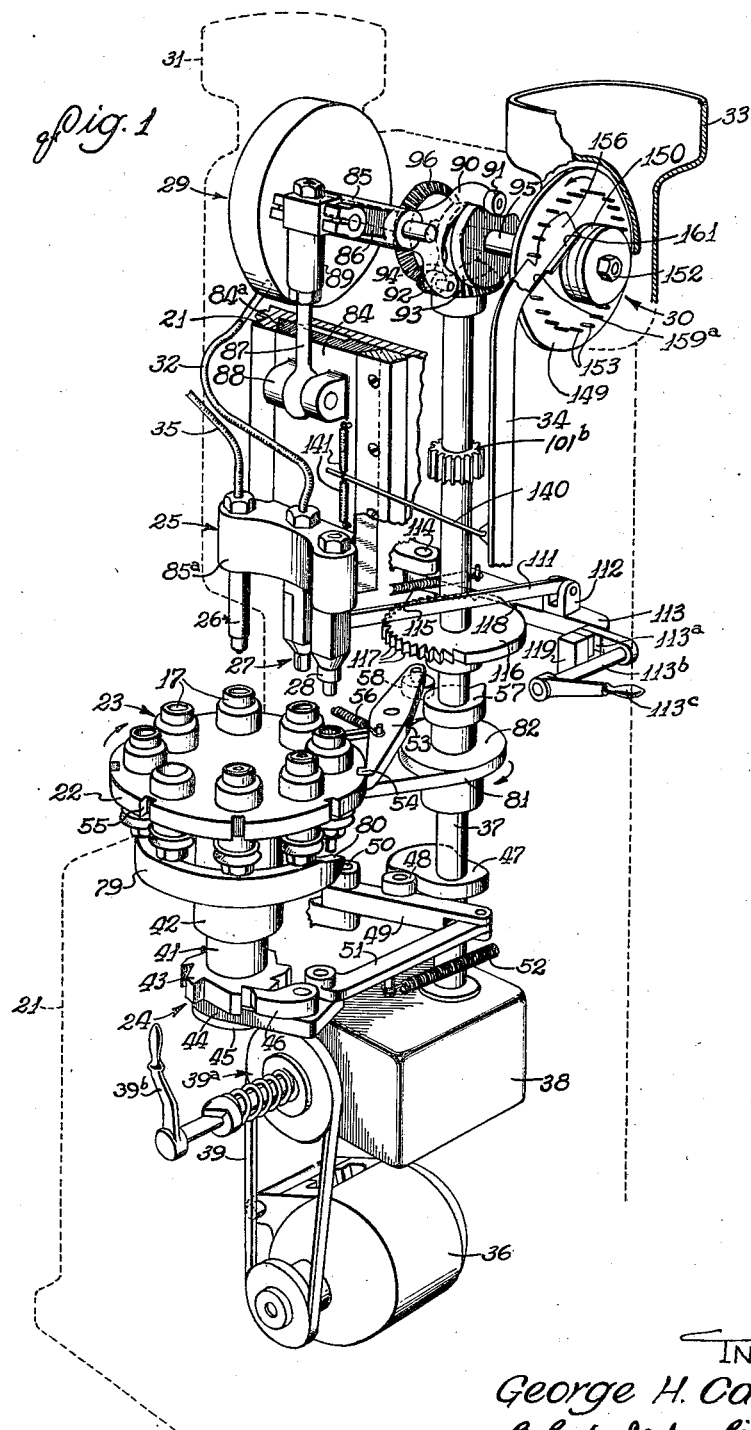

The improved method may be employed advantageously in the assembly of various types of machine elements, such as bearings, and is particularly adapted for assembling the parts of a roller bearing of the type shown in various stages of assembly in Figs. 2, 3, and 4. These parts include an outer race 17 having an internal cylindrical bearing surface, a series of rollers 18 arranged in side-by-side contact around the bearing surface, and an annular retaining member or ring 19 which serves to hold the rollers in the race. In order to retain the assembled rollers in the race prior to the insertion of the retaining ring, the rollers and inner surface of the race may be coated with a thin layer of cup grease or the like as indicated at 20.

In assembling a bearing according to the improved method contemplated by the invention, the internal surface of the race 18 is first coated with a thin layer of viscous material such as cup grease or the like. The rollers 19 are then fed into the race one-by-one in an axial movement and when properly located with respect thereto, they are shifted radially within the race and lined up in side-by-side contact around the internal surface thereof. During this inserting operation it is desirable to effect a relative angular movement between the race and the roller feeding means to facilitate the lining-up of the rollers. The series of rollers thus assembled in the race is retained in place by the coating of grease so that the partly assembled bearing may be handled without danger of the rollers being displaced. Assembly of the bearing is completed by the insertion of the retaining ring 19.

While the various steps of the above described assembly method may be carried out manually, it is ordinarily preferable to employ an assembling machine for this purpose. A machine of this character adapted to perform the assembling operations automatically is shown in the accompanying drawings and will be described in detail hereinafter.

Referring now to Fig. 1, the assembling machine in its preferred form includes a frame or base 21, shown in dotted lines, which supports a horizontally disposed movable table 22 having a plurality of rotatable carriers 23 by which certain of the bearing parts, such as the race rings 17, are carried. In the operation of the machine, the table is advanced in intermittent steps by appropriate driving means such as a pawl and ratchet mechanism 24 whereby the carriers 23 are advanced successively through the various operating stations at which other bearing parts are assembled with the races. There are three such stations in the machine illustrated. As the carriers approach the operating stations, the parts which they carry are automatically clamped in position and at one of the stations means is provided for rotating the carrier during its dwell at that station.

On the upper part of the base 21, an operating head generally designated 25 is mounted for reciprocation toward and from the table 22. The head 25 carries an assembly unit for each assembling operation that the machine is required to perform. These units are located at points at which the carriers are permitted to dwell between movements of the table and constitute operating stations of the machine. The other points at which the carriers dwell may serve as loading and unloading stations for the carriers. The assembly units are arranged to cooperate with the respective carriers at the operating stations in the reciprocation of the head.

In the embodiment herein illustrated, the assembly units include a grease injecting unit 26 cooperating with the carrier at the first operating station, a roller inserting unit 27 cooperating with the carrier at the second operating station, and a retaining ring setting unit 28 cooperating with the carrier at the third operating station. Suitable drive mechanism is provided for reciprocating the head in timed relation to the movement of the table 22.

While the assembly units may be supplied with parts in any suitable manner, an automatic feed mechanism is advantageous and for this purpose a roller feed mechanism 29 and a retaining ring feed mechanism 30 is provided. A receptacle or hopper 31 receives the rollers 18 from which they may be fed by the mechanism 29 to the assembly unit 27 through a suitable chute 32 which, in the present instance, is in the form of a flexible tube. A second receptacle or hopper 33 receives the retaining rings 19 and the feed mechanism 30 is arranged to feed the rings therefrom to a chute 34 which delivers the rings to the third operating station where they are set in the race rings by the assembly unit 28. Any suitable means may be employed to supply grease to the unit 26. Preferably, this means includes a metering device as shown in Figs. 17 and 18 for delivering a measured quantity of grease to the unit 26 in each operating cycle of the machine.

Power for operating the various elements of the machine is supplied by a motor 36 which is drivingly connected in any suitable manner with a vertically disposed main shaft 37, carrying suitable gears, cams and pulleys for operating the elements in the desired sequence. The shaft may be journaled in suitable bearings carried by the frame 21 and preferably, is enclosed within the frame. As shown herein, a speed reducing gear train enclosed in a gear box 38 is interposed between the motor and the shaft. A belt 39 provides a driving connection between the motor and the gear box. A friction clutch 39$^a$ actuated by a hand lever 39$^b$ permits manual starting and stopping of the mechanism.

Having in mind the general arrangement of the machine as above set forth, the construction and operation of the preferred embodiment will now be described in detail. Referring first to Fig. 1, the table 22 is adapted, in this instance, for rotary movement. It is preferably circular in form and is rigidly secured to the upper end of a supporting shaft 41 journaled in a vertical bearing 42 carried by the frame 21. As herein shown, the table is provided with eight carrier units 23 and these are uniformly spaced in a circular row concentric with the axis of the table. The table thus has eight different positions through which the carriers are moved successively in the rotation of the table. The ratchet mechanism 24 by which the table is rotated is operatively associated with the lower end of the shaft 41.

The ratchet mechanism 24 includes a ratchet wheel 43 fast on the shaft 41. As herein shown, the ratchet wheel is provided with eight teeth, one for each carrier position of the table 22, and the teeth are uniformly spaced so that each step shifts the carriers from one station to the next. A plate 44 loosely mounted on the shaft 41 and held in place thereon by a cap 45 carries a pawl 46 adapted to cooperate with the teeth of the ratchet wheel and advance the same step-by-step when the plate is oscillated. The pawl may be yieldably held in engagement with the ratchet wheel by any suitable means such as a spring.

Oscillation of the plate 44 to advance the table 22 is effected in the present instance by means of a cam 47 fast on the shaft 37. The cam coacts with a follower 48 carried by a lever member 49 which is pivotally mounted at one end on the frame of the machine as indicated at 50. An arm 51 connects the other end of the member 49 with the plate 44 so that when the cam 47 rocks the member to the left, as viewed in Fig. 1, the pawl 46 engages a tooth of the ratchet wheel 43 and advances the wheel and table 22 one step in a clockwise direction. A tension spring 52 connected between the arm 51 and the frame operates to hold the follower 48 against the cam.

In the machine herein disclosed, provision is made to advance the table 22 one step in each revolution of the shaft 37 which constitutes an operating cycle of the machine. The advance may be effected at either end of the cycle and the cam 47 is preferably so shaped that only a relatively small portion of the cycle is required for this purpose. During the remainder of the cycle, the table is held stationary while the assembling operations are carried out as will be described hereinafter.

Locking mechanism of simple and rugged construction operates to accurately stop and position the table 22. This mechanism includes a locking bar 53 pivotally supported intermediate its ends on the frame of the machine for movement in a horizontal plane. One end of the bar 53 is formed with a lug 54 adapted to enter a slot 55 formed in the periphery of the table and thus positively lock the table against rotation. As herein shown, the table has eight slots 55, one for each carrier. A tension spring 56 acting on the bar 53 tends to hold the lug in the slot.

When the table is o be advanced a step, it is unlocked by a cam 57 on the shaft 37 which acts through a follower 58 on the bar 53 to rock the bar about its pivot and withdraw the lug 54 from the slot 55. As will be seen in Fig. 1, the cam 57 is so positioned with respect to cam 47 that the table is released for rotation just before the pawl 46 engages the tooth of the ratchet wheel. To prevent any possibility of the table overrunning due to its inertia, the locking bar is held in withdrawn position only until the slot 55 is moved out of registration with the lug 54. The bar is then released to the action of its spring and the lug rides over the edge of the table until the next slot is moved into registration therewith whereupon it enters the slot and prevents further movement of the table. The table is thus stopped with the carriers properly positioned at the various stations and is so held until the assembling operations have been completed.

Accidental movement of the table 22 is prevented while the head 25 is lowered and in working position, by means of a locking bar 55ᵃ rigidly attached to the head and arranged to enter one of the slots 55 when the head is lowered as shown in Fig. 7. The table is thus positively locked until the head 84 is again raised.

The carriers 23 by which the race rings 17 are supported are all of the same construction. Referring to Figs. 5, 6 and 7, each carrier comprises a hollow cylindrical body portion 61 terminating at the upper end in a head 62 in which is formed a recess 63 suitably shaped to receive the race ring 17. The carrier is rotatably supported in a bearing 64 in the form of an elongated sleeve through which the body portion 61 of the carrier projects. A reduced portion formed on the upper end of the sleeve is adapted to fit into an aperture in the table 22 and providing a shoulder 65 adapted to bear against the underside of the table and thus limit the upward movement of the sleeve. The end of the body 61 projecting below the sleeve 64 carries a V-pulley 66 secured thereto by means of a key 67 and held in place by a nut 68 threaded onto the end of the body portion. Pulley 66 provides a means of rotating the carrier and cooperates with the head 62 to clamp the carrier and sleeve 64 in place on the table.

It has been found desirable to provide for clamping the race rings firmly in place in the carriers during the assembling operations and to this end each of the carriers includes automatically operating clamping means of an advantageous character. Referring to Fig. 7, it will be observed that the head 62 of the carrier is formed with a radial slot 71 extending into the recess 63 in which the race rings 17 are set. Pivotally supported in this slot is a clamping member 72 in the form of a bell crank lever having a vertically disposed arm 73 adapted to engage the side of a race ring in the recess 63. A horizontally extending arm 73ᵃ has an end portion shaped to fit into a transverse slot 74 formed in the upper end of a plunger 75 mounted within the hollow body of the carrier. The lower end of the plunger 75 is enlarged to provide a shoulder 76 (Fig. 5) against which one end of a compression spring 77 bears. The other end of the spring bears against an internal shoulder 78 formed within the hollow body and the spring thus tends to force the plunger downwardly. By reason of the connection 74, the plunger thus tends to rock the bell crank member 72 on its pivot and cause it to grip the race ring tightly in the carrier.

To facilitate loading and unloading of the carriers, the clamping mechanism above described is automatically disabled when the carriers are moved out of the assembling stations. The means for disabling the clamping mechanism comprises a cam 79 supported on the frame of the machine and adapted to coact with the lower ends of the plungers 75 as shown in Fig. 1 to raise the same and thus rock the clamping members 72 out of engagement with the race rings. The cam 79 is preferably arcuate in form and is provided with inclined cam surfaces 80 at each end for gradually lowering and raising the plungers as the carriers are moved to and from the assembly stations in the rotation of the table. Thus, when a carrier is stepped out of the last assembling station, the plunger 75 is elevated by the action of the cam to disable the clamping mechanism and the assembled bearing may be unloaded readily from the carrier and another race ring inserted therein. As a carrier is advanced to the first assembling station, the plunger 75 is permitted to descend under the influence of its spring and clamp the race ring in place so that the assembly operations may be carried out efficiently.

To obtain a uniform distribution of grease in the race rings and to facilitate the insertion of the rollers therein, it has been found advantageous to effect a relative angular movement between the rings and the assembling units while these operations are being carried out. As herein shown, the relative angular movement of the parts is effected by rotating the carriers 23 during their dwell in the grease injecting and roller inserting stations. One form of the carrier rotating mechanism is shown in Figs. 1 and 6 and comprises generally a belt 81 running over a driving pulley 82 fast on the shaft 37 and over a pair of idler pulleys 83 mounted on the frame of the machine. The pulleys 83 are so positioned that the section of the belt between them engages the pulleys 66 of the carriers located at the first and second assembling stations which are thus rotated during their dwell at these stations. Since the pulley 82 is mounted on the main drive shaft 37, the rotation of the carriers in this instance will be in timed relation to the other operations of the machine.

The rotation of the table 22 serves to position the race rings at the assembly or operating stations so that the assembling units may cooperate with them and carry out the assembling operations. The head 25 which carries the assembly units is mounted above and to one side of the table 22 and includes a plate 84 slidably mounted in a dovetail guideway 84$^a$ carried by the frame 21. One side of the guideway may be removably secured in place to provide for readily assembling and disassembling the machine. A brasket 85$^a$ of generally arcuate form secured to the plate 84 provides a support for the assembling units and serves to locate them properly with respect to the carriers on the table 22.

Any suitable means may be employed for reciprocating the slide 83. In the present instance, the reciprocating means is in the form of a cam actuated mechanism adapted to be driven from the main shaft 37. The mechanism includes a horizontally disposed rocking member 85 pivotally supported transversely of the upper end of the frame of the machine. The member is preferably formed with a forwardly extending bifurcated arm 86 projecting over the slide 83 and operatively connected thereto. This connection may conveniently comprise a drawbar 87 pivotally secured at one end between a pair of lugs 88 formed on the slide and having the other end adjustably anchored in a connecting member 89 carried in trunnions formed in the legs of the bifurcated arm 86.

The rocker member 85 is also provided with a rearwardly extending arm 90 of generally Y-shaped form carrying oppositely facing cam followers 91 and 92 coacting respectively with cams 93 and 94. The cams are carried by a transverse shaft 95 suitably journaled in the frame of the machine and driven from the main shaft 37 by a set of bevel gears 96. In the present instance, the gear ratio is such that the shaft 95 is rotated at the same speed as the main shaft 37 and the cams are therefore shaped so as to operate the rocker member 85 through one cycle in each revolution of the shaft.

Cams 93 and 94 as shown in Fig. 1 are positioned for the beginning of an operating cycle. As shaft 37 and its cams rotate, shaft 95 and cams 93 and 94 rotate in timed relation thereto. Cam 93 immediately acts on the follower 91 to rock the member 85 in a counter-clockwise direction and thus quickly move the head 25 toward the carriers on the table 22. To allow sufficient time for the performance of the assembling operations, the cam 93 is formed so that it continues to act on the follower and maintain the head in its lowermost position throughout a substantial part of the operating cycle. Cam 94 then becomes operative to act on the follower 92 and rock the member 85 in a clockwise direction and thus move the head 25 to its withdrawn position. The timing of this cam is such that the assembling units carried by the head are withdrawn from engagement with the carriers before cam 57 operates to unlock the table 22.

The assembling operations are performed by the assembling units 26, 27 and 28 when the head 25 is in its lowermost position as above described. In the present instance, the first assembling operation consists of injecting a measured quantity of grease or other suitable viscous material into the race ring positioned at the first operating station.

The unit 26 for injecting the grease comprises a tubular member 26$^a$ having a reduced end portion 26$^b$ of somewhat smaller diameter than the interior of the ring as shown in Fig. 2. When the end 26$^b$ is inserted in a ring, it thus defines, with the walls of the ring, a relatively narrow, substantially uniform space in which a thin layer of grease may be deposited. The end 26$^b$ is formed with an interior aperture 97$^a$ communicating with the tubular member 26$^a$ and from this aperture extend radial discharge ducts 97. In the present instance, two discharge ducts are shown, one extending substantially horizontally to discharge into the upper part of the space within the ring and the other inclined downwardly to discharge into the lower part of this space. This arrangement of the ducts insures uniform distribution of the grease over the walls of the race when the race is rotated as hereinbefore described.

Discharge of grease in the absence of a race ring in the carrier is prevented by a valve mechanism comprising a valve member 98 reciprocable within the tubular member 26$^a$ and adapted to seat against an internal shoulder 97$^b$ formed within the tubular member and thus close the entrance to the aperture 97$^a$. A spring 98$^b$ normally urges the member 98 into valve closing position. A plunger 98$^a$ is formed on the end of the member 98 and disposed so as to project through an aperture in the end 26$^b$. When the end 26$^b$ is inserted in a race ring, the plunger 40 engages the bottom of the ring and forces the valve member upwardly against the action of the spring 98$^b$ thus opening the valve for the discharge of grease into the ring. In the event that the head 25 is lowered with no race ring in the carrier 25, the plunger 98$^a$ will remain in the position shown in dotted lines to maintain the valve closed and prevent the discharge of grease into the carrier.

A measured quantity of grease is supplied to the fixture 26 in each operating cycle of the machine by the grease metering device shown in Figs. 17 and 18. This device comprises a casing 99$^a$ supported on the frame 21. Formed within the casing is an inlet duct 99$^b$ and an outlet duct 99$^c$ terminating at opposite sides of a cylindrical aperture extending through the casing substantially at right angles to the ducts. Rotatably supported in the aperture is a cylindrical metering element 100$^a$ in which is formed a transverse passage enlarged at each end to constitute two diametrically opposed chambers 100$^b$ adapted to register with the ducts 99$^b$ and 99$^c$. A plunger 100$^c$ is disposed within the passage for reciprocation between the chambers 100$^b$.

Grease under pressure is supplied to the inlet duct 99$^b$ by way of a conduit 35$^a$ connecting with a suitable source of supply such as a high pressure grease pump. When the metering element is positioned as shown in Fig. 18, the grease flows into the chamber 100$^b$ in registration with the inlet duct and forces the plunger 100$^c$ to the left. The supply of grease thus deposited in the chamber is carried around to the duct 99$^c$ in the rotation of the metering element and is discharged into this duct by the operation of the plunger 100ᶜ when the companion chamber receives its supply of grease from the duct 99ᵇ. Thus the plunger operates to discharge a measured quantity from the chambers 100ᵇ alternately into the outlet duct 99ᶜ from which the grease is delivered to the injecting unit 26 through the flexible tube 35.

In order to coordinate the operation of the metering deviced with the other operations of the machine, the metering element is arranged to be rotated from the main shaft 37. To this end a spur gear 101ᵃ rigidly secured to one end of the metering element 100ᵃ is arranged to mesh with a pinion 101ᵇ fast on the shaft 37. As herein shown, the gear ratio is such that the metering element makes one half revolution for each revolution of the shaft 37 so that the supply of grease from one chamber is discharged into the injecting unit in each operating cycle of the machine.

The second assembling operation, namely that of inserting the rollers in the race ring, is carried out at the second operating station at which the ring with its deposit of grease is positioned by an advancing step of the table. The unit 27 provided for this purpose is shown in detail in Figs. 5, 7, and 8. Referring first to Fig. 7, it will be observed that the unit includes an elongated inserting member 99 rigidly supported in an aperture in the bracket 85ᵃ and secured thereto by means of a nut 100 threaded onto the upper end of the member. The portion of the member 99 projecting below the support has one side cut away to receive a complementary shaped auxiliary member 101 (Fig. 5) which is yieldably secured to the member 99 by means of a bolt 102 and compression spring 103. The two members are reduced at one end to form a cylindrical element 104 adapted to fit into a race ring leaving sufficient space around the periphery of the ring for a row of the rollers 18.

Extending longitudinally through the member 99 and along one side of the auxiliary member 101 is a duct 105 having a diameter slightly larger than the rollers 18 and providing a passage through which the rollers may be fed in end-to-end relation. The duct 105 terminates in a laterally opening outlet 106 (Fig. 5) formed at one side of the element 104 through which the rollers may be discharged radially of the member. A lug 105ᵃ extending across the bottom of the duct provides a stop for the rollers 18 adjacent the opening 106. To facilitate the ejection of the rollers, the duct is preferably located so as to lie close to the front surface of the element 104. Rollers may be fed to this duct in any suitable way through the chute 32 which in the present instance is in the form of a flexible tube.

Referring to Fig. 5, it will be observed that the outlet 106 is somewhat narrower than the diameter of the roller due to the formation of a lip 107 at one edge thereof. Preferably, the lip is formed on the auxiliary member 101 which is yieldably secured to the member 99. The rollers are thus held in the duct until forcibly ejected against the action of the spring 103 and accidental discharge of the rollers is effectually prevented.

Ejection of the rollers from the inserting member is effected by a novel and efficient mechanism adapted to be operated in timed relation to the other operations of the machine. Referring to Fig. 7, the ejecting mechanism includes a reciprocable pusher arm 108 in the form of a rectangular bar projecting through an inclined slot formed in the lower end of the member 99 so as to engage the lowermost roller in the duct 105. The upper end of the arm 108 is pivotally connected with a link 109 which, in turn, is pivotally anchored in a slot formed in the member 99 as indicated at 110. The arm and link thus constitute a toggle mechanism to which is connected an operating arm 111 which has its other end pivotally secured to a bracket 112 formed on one end of a lever member 113. Lever 113 is pivoted at one end on the frame of the machine as indicated at 114 and a spring 115 tends to draw it to the left, as viewed in Fig. 1. Thus, when the lever 113 is released to the action of its spring, it operates through the medium of the arms 111 and 108, and ejects a roller 18 through the outlet 106 into the race ring. The spring actuation of the ejecting mechanism effectually guards against any possibility of the machine or bearing parts being damaged in the event that the outlet from the inserting member should be temporarily blocked by a previously ejected bearing.

The operation of the ejecting means is preferably controlled by a cam 116 mounted on the shaft 37 and adapted to cooperate with a projection 118 formed on the lever 113. The cam 116 is formed with a plurality of tooth-like indentations 117 into which the projection 118 is permitted to drop when the cam is rotated thus oscillating the lever 113 and the ejecting arm 108 whereby the rollers are ejected one by one into the race ring. A portion of the cam 116 is formed without indentations and operates to hold the lever 113 in withdrawn position while the head 25 is being raised and lowered and while the table 22 is being advanced and prevents the ejection of rollers at this time. The forward stroke of the lever 113 is limited by a stop 119 carried on the frame of the machine and adapted to coact with the free end of the lever.

The ejecting mechanism is adapted to be temporarily disabled by a manually operable control means including a wedge shaped arm 113ᵃ rigidly attached to a shaft 113ᵇ which is rotatably mounted in the frame 21. A hand lever 113ᶜ fastened to the other end of the shaft permits the wedge to be lowered into the path of the arms 113 as shown in Fig. 1. In this position, the projection 118 is prevented from entering the indentations 117 and the ejecting arm 108 remains in retracted position. By turning the lever 113ᵃ clockwise as viewed in Fig. 1, the wedge is withdrawn and normal operation resumed. It will be apparent from the foregoing that the roller inserting mechanism operates automatically to carry out the improved assembling method hereinbefore described. In each cycle of the machine, the mechanism operates to insert rollers 18 one-by-one in the race ring 17 and shifts these rollers radially into the channel formed by the inserting element and the race to line them up in side-by-side contact around the periphery of the race. The rollers are retained in place by the layer of grease on the wall of the ring. Assembly of the rollers in the race is facilitated and blocking of the outlet of the inserting unit is effectually prevented by rotation of the race ring while at the second operating station.

To insure insertion of the full complement of rollers in each race ring, the number of indentations in the cam 116 may be somewhat greater than the number of rollers to be inserted. Thus, the outlet of the inserting unit may be blocked temporarily by a previously ejected bearing, causing the mechanism to skip one or more ejections, and the mechanism will still be effective to turn out a complete assembled bearing. At the same time, the mechanism is prevented from inserting more than the required number of rollers in a ring by reason of the fact that, when the full series of rollers is assembled in the ring, the outlet 106 is blocked. Since the mechanism is spring driven in its ejecting operation, neither the rollers nor the machine is damaged by the attempted ejection of additional rollers.

In its preferred form, the bearing assembling machine is provided with automatic feed mechanism for supplying rollers to the roller inserting unit 27 above described. The feed mechanism, generally indicated by the reference character 29 in Fig. 1, and shown in detail in Figs. 9 and 10, is operatively associated with the hopper 31 which may conveniently be mounted on the upper part of the frame of the machine. It includes an efficient roller withdrawing and elevating mechanism together with a simple and reliable lining-up device whereby the rollers are withdrawn from the hopper, alined in end-to-end relation, and delivered via the flexible tube or chute 32 to the roller inserting fixture. Thus, the rollers may be deposited in the hopper 31 in bulk and the mechanism operates automatically to withdraw them from the hopper and direct them, properly alined, into the chute 32. The rollers are then carried by gravity through the chute to the inserting unit.

As herein shown, the feed mechanism 29 includes an elevator 121, of generally drum shaped form, fast on the transverse shaft 95. The elevator 121 is formed with a peripheral side wall 122 terminating in an inwardly extending annular flange 123 which, with the wall, defines an inwardly opening channel around the periphery of the elevator. Within the channel is a series of transverse ledges formed by lugs 124 disposed at spaced points around the periphery of the elevator. The lugs are preferably formed with two angularly inclined legs, one leg being suitably secured to the wall 122 as by bolts 125 and the other leg projecting into the interior of the elevator 121 in a generally radial direction. The projecting legs are thus operative to catch any rollers that may be present in the channel and each leg carries one or more of the rollers along with the rotating elevator until its inclination with respect to the horizontal plane permits the part to slide off of the leg.

Referring now to Fig. 10, it will be observed that the elevator 121 is disposed adjacent the hopper 31 with its open end communicating therewith through an outlet 126 formed substantially at the bottom of the hopper side wall 127. Thus, when a supply of rollers is placed in the hopper, a portion of them will pass through the outlet 126 and into the channel in the rotating elevator 121. As the elevator rotates, the rollers thus deposited in the channel are caught by the lugs 124 and carried upwardly through slightly more than a quarter revolution of the member to be discharged into a lining-up device 128 which lines them up in the desired manner and directs them into the main chute 32.

As herein shown, the lining-up device 128 is in the form of a generally V-shaped trough having a pair of diverging side walls 129 and 130 joined together along one edge to form an inclined trough. The wall 129 is disposed in a substantially vertical plane against the side wall 127 of the hopper to which it may be secured in any suitable manner to support the device. The wall 130 is flared outwardly at its upper end so as to extend into the rotating member 121 in a position to receive the rollers discharged therefrom and to direct the rollers to the trough down which they slide in end-to-end relation.

In order to maintain an ample supply of rollers in the inserting unit, the elevator 121 is arranged to deliver rollers to the lining-up device in excess of the quantity required by the unit. To guard against the possibility of the mechanism becoming jammed by reason of this excess supply of rollers, the lining-up device 128 is positioned so that its discharge end is separated from the end chute 32 by a gap slightly longer than the length of a roller as shown in Fig. 9. The rollers leave the trough of the lining-up device with sufficient momentum to carry them across the gap and into the chute 32. When the chute becomes filled as shown in the drawings, succeeding rollers discharged from the lining-up device are deflected into the hopper. To prevent any possibility of a roller blocking the entrance to the chute, the upper side of the chute may be cut away as shown at 131. Thus, rollers that only partly enter the chute may drop into the hopper.

Each roller 18 gains considerable momentum while passing down the trough of the lining-up device 128. This momentum is effectively utilized to supplement the force of gravity in feeding the rollers to the inserting unit 27. Each roller imparts a light hammer blow to those already accumulated in the chute 32, thus acting to dislodge any that may have become stuck and effectually preventing the rollers from clogging the chute.

Upon the next step of the table 22, the race ring, with its assembled series of rollers held in place by the coating of grease, is advanced to the third operating station of the machine. In the present instance, the retaining ring 19 is assembled with the other parts at this station. The retaining ring is delivered to the station by the chute 34 and positioned immediately above the partly assembled bearing into which it is forcibly inserted by the inserting unit 28 in the next downward stroke of the head 25.

Referring particularly to Fig. 12, it will be observed that the chute 34 comprises a substantially vertical upper section terminating in a forwardly curving lower section which projects over the carrier. A suitable bracket 133ª carried on the frame of the machine supports the lower end of the chute in operative relation to the carrier at the third operating station.

The chute 34 preferably comprises a pair of spaced, substantially parallel side rails 132 having longitudinally extending slots 133 (Figs. 12, 15 and 16) in opposite faces forming a track down which the retaining rings may be carried by gravity. An arm 134 depending from pins 134ª carried by the bracket 133ª serves as a stop to prevent the rings from passing out at the end of the chute and positions them in operative relation to the inserting unit 28.

Delivery of the retaining rings to the operating station one at a time is effected by a ring release mechanism of simple and advantageous character. As shown herein, the mechanism includes a release arm 135 of generally rectangular form pivotally supported at 136 on a bracket 137 mounted on one of the rails 132. The arm 135 is formed with fingers 138 and 139 at opposite ends. These fingers constitute stops for the retaining rings and are adapted to be interposed alternately in the chute 34. The relative spacing of the fingers is such that, when the arm is tilted downwardly, the finger 138 temporarily blocks the lowermost retaining ring in the chute, and when the arm is tilted in the opposite direction, the finger 138 is withdrawn from its blocking position to release that retaining ring and at the same time, the finger 139 is moved into blocking relationship to the next retaining ring. On the next operation, the last mentioned retaining ring is released by the finger 139 and is caught and held by the finger 138 until released as above described.

In order to coordinate the release of the retaining rings with the other operations of the machine, the release arm 135 may be conveniently operated as an incident to the reciprocation of the head 25. To this end, an operating member 140 is rigidly secured at one end to the arm 135 and yieldably secured at the other end to the sliding plate 84 by means of opposed springs 141 (Fig. 1). The yieldable connection eliminates any possibility of damaging either the machine or the retaining rings in the event that one of the rings should stick in a position to block the release arm. It will be apparent that, with the above arrangement, one retaining ring will be released in each upward reciprocation of the head 25 and thus the rings will be delivered to the operating station one at a time as required.

Transfer of the retaining rings from the chute 34 to the race rings is effected by the ring setting unit 28 in its downward stroke. The chute 34 terminates at its lower end in a ring holding mechanism adapted to releasably hold one ring at a time in operative relation to the setting unit. The holding mechanism comprises a pair of yieldable rails 142 pivotally supported on the pins 134a at opposite sides of the rails 132. The inner ends of the rails 142 are beveled as shown at 145 so as to underlie the track formed by the slots 133 and form a continuation thereof. A spring 143 (Fig. 15) connecting between the rails tends to draw the rails together and position the beveled ends to receive and support a ring discharged from the chute. Stop pins 144a set in the bracket 133a limit the inward movement of the rails and are preferably so placed as to aline the beveled faces 145 of the rails with the slots 133.

As each ring is released by the arm 135, it slides down the chute 34 and comes to rest against the stop 134 resting on the beveled surfaces 145 of the rails 142. The ring setting unit in its downward stroke is thus enabled to release the ring by camming the rails 142 outwardly by pressing the ring against the beveled surfaces of the rails. Continued movement of the setting unit deposits the retaining ring in the race ring at the third operating station.

The inserting unit 28 (Figs. 12 and 16) comprises a plunger rigidly secured in the bracket 85a carried by the head 25. As herein shown, the plunger is formed with a rectangular body portion 146 tapering at its lower end to a cylindrical intermediate portion 147 of substantially the same diameter as the race ring 17. The plunger terminates in a cylindrical end portion 148 of a diameter such as to allow it to enter the aperture in a retaining ring, the lower edge of the end portion being suitably beveled to facilitate such entry. Thus, as the plunger descends from the position shown in Fig. 12, the end portion 148 first enters the aperture in the retaining ring and positions that ring squarely above the race ring 17 at the operating station. On further descent of the plunger, the shoulder formed between the end portion 148 and the intermediate portion 147 engages the retaining ring and forces it from between the pivoted rails 142 and into the race ring 17. Preferably, the retaining ring is of a diameter such as to provide a press fit with the race ring so that a permanent bearing structure results.

While the retaining rings may be supplied to the chute 34 in any suitable manner, the speed and efficiency of the assembling machine is materially increased by employing automatically operating mechanism for this purpose. This mechanism, as herein shown, includes means for extracting the retaining rings individually from the hopper 33 in which they may be deposited in bulk and means for alining or positioning the rings so that they will be delivered to the ring setting unit properly oriented for insertion in the race rings.

As herein shown (Figs. 1 and 11), the means for extracting the rings from the hopper 33 comprises a rotatable disk 149 mounted on one end of the transverse shaft 95 and disposed within and at one side of the hopper 33. Preferably, the disk 149 is secured to the shaft in such a manner that it will normally rotate with the shaft, but may be stopped in the event that the parts become jammed in the mechanism while the shaft continues the rotation. To this end, the disk 149 is provided on each side with a collar 150 adapted to be frictionally gripped between spaced friction members 151 fast on the shaft 95. The gripping action of the friction members may be varied as desired by adjustment of a nut 152 (Fig. 1) threaded onto the end of the shaft 95 which holds the various parts together on the shaft. Thus, the disk 149 will rotate with the shaft 95 unless blocked by parts becoming jammed in the mechanism which offer sufficient resistance to overcome the frictional action of the driving members.

For the purpose of picking up retaining rings in its rotation, the disk 149 carries a series of horizontally projecting pins 153 which may be conveniently arranged in a circular row concentric with the axis of the member. As the member rotates, the pins are forced through the mass of rings in the hopper and catch in the apertures of the rings, each pin usually picking up one or more of the rings and carrying the same along as it moves in its circular path. A further series of pins 154, spaced outwardly from the first mentioned row of pins and preferably inwardly inclined with respect to the plane of the member 149 operate to stir up the rings in the hopper and prevent the formation of a channel through the mass of rings, thus insuring a continuous supply of rings for the pins 153. As a further means of insuring the desired operation of the mechanism, the hopper may be provided with an inclined baffle 155 for directing the rings into the path of the pins 153.

The retaining rings picked up by the pins 153 are removed from the pins, tested for orientation and either returned to the hopper or fed to the chute 34 by the alining mechanism associated with the upper end of the chute as shown in Fig. 11. For removing the rings from the pins, this mechanism includes a generally rectangular plate 156 supported adjacent one side of the disk 149 and inclined downwardly and outwardly from the plane of the disk so as to intersect the path of rotation of the pins 153. At the point of intersection, the plate is formed with a generally arcuate slot 157 of a width sufficient to permit the passage of the pins while the retaining rings carried by the pins are cammed outwardly by the plate to release them from the pins.

The retaining rings 19 employed in the bearing herein disclosed are formed with a projecting flange 158 (Fig. 13) around the inner edge of the annular body portion. The necessity of assembling each bearing with the retaining ring and race ring in the same relative relationship will be apparent. This relationship, in the present instance, contemplates the assembly of the retaining ring with the flange 158 projecting into the race ring and it is, therefore, necessary to provide means for insuring that all rings entering the chute 34 will be positioned with the flanges facing downwardly when the rings are delivered to the ring setting unit.

The race rings are picked up indiscriminately by the pins 153 and may thus be deposited on the plate 156 with the flanges 158 facing either up or down. The alining mechanism takes care of this condition by selectively deflecting improperly positioned rings into the hopper 33 while the properly positioned rings are delivered to the chute 34. As shown in Fig. 14, this mechanism includes a plate 159 riveted or otherwise secured to the plate 156 and extending longitudinally along one edge thereof to define, with the plate 156, an inclined run communicating with the chute. The thickness of the plate 159 is preferably somewhat less than the height of the flanges 158 of the retaining rings and thus forms a relatively narrow ledge 159ª along which the rings with upturned flanges may pass and enter the opening 160 in the upper end of the chute 34. On the other hand, rings with downturned flanges will slide over the ledge 159ª and plate 159 and fall back into the hopper 33 from which they may be subsequently withdrawn by the pins 153. To guard against the possibility of the rings being prematurely deflected into the hopper, the upper end of the plate 159 may be bent upwardly to form a shoulder 161 adjacent the arcuate slot 157.

The selective deflection of the retaining ring is facilitated by forming the rings so that the side wall of the flange 158 is inclined outwardly with respect to the ring as shown in Figs. 13 and 14, although it is to be noted that such construction is by no means necessary to the proper operation of the mechanism. The mechanism is capable of selectively lining-up articles other than retaining rings, when such articles have characteristics by which one side can be distinguished from the other, as, for example, a rounded or beveled edge on one side and a substantially straight edge on the other side.

In the present instance, rings with downturned flanges are positively prevented from entering the chute 34 by reason of the form of the opening 160 as shown in Fig. 11. Improperly oriented rings that may momentarily hang on the ledge formed by the plate 159 are quickly dislodged by subsequent rings delivered by the pins 153.

The operation of the machine will be apparent from the foregoing description, and briefly is as follows:

The race rings 17 are loaded into the carriers 23 and the motor started. During the first cycle, the race ring at the first station will receive a deposit of grease. The roller inserting unit at the second operating station may be disabled by inserting the wedge 113ª between the arm 113 and the abutment 119 so no rollers will be discharged until a race ring properly coated with grease is presented at the second operating station. Assuming that the hoppers 31 and 33 contain an adequate supply of rollers and retaining rings, the clutch 36 may now be engaged.

As the main shaft 37 and transverse shaft 95 start to rotate, cam 93 operates to lower the head 25, thus bringing the assembly units 26, 27 and 28 into operative relation to the carriers at the three operating stations respectively. The head is maintained in this position for a substantial part of the operating cycle and, during this time, the grease injecting unit 26 discharges grease into the rotating race ring at the first station. The carriers are then advanced a step to the succeeding operating stations.

At the end of the first cycle, the wedge 113ª may be retracted so that as the second cycle begins, rollers are inserted in the race ring at the second station by the action of the cam 116 on the lever 113 and pusher arm 108, the race ring being rotated during this operation by the pulley 82 through the medium of the belt 81. As it was assumed that no race ring was initially positioned at the third station, there will be no assembly operation performed at that station in the first or second operating cycle of the machine, the retaining rings 19 may be manually detained until a race ring is presented in the third cycle.

As the shafts approach the end of a full revolution and after the cam 116 has operated to assemble a full series of rollers in the race ring at the second station, cam 94 operates to raise the head 25 and withdraw the assembly units to retracted position. Cam 57 then becomes operative to rock the locking bar out of locking engagement with the table 22 and immediately afterward, cam 47 operates through the pawl and ratchet mechanism to advance the table one step. The locking bar stops the table with the carriers properly positioned for the next operating cycle A new race ring is thus positioned at the first operating station and this ring is firmly clamped to the carrier through the medium of the clamping mechanism cooperating with the stationary cam 79. The race ring, which received a deposit of grease during the preceding operating cycle, is advanced to the second operating station to receive its complement of rollers in the next operating cycle. And the race ring with the series of rollers assembled therein at the second station is advanced to the third station to receive a retaining ring in the next operating cycle.

The foregoing operations are repeated in each operating cycle and a completely assembled bearing is delivered from the third operating station. The bearing is automatically unclamped by the action of the cam 79 and may be removed by the attendant and replaced with a new race ring. Thus, the attendant is only required to unload the assembled bearings, load the race rings in the carriers, and maintain an adequate supply of rollers and retaining rings in the hoppers 31 and 33. Since there are always a plurality of carriers out of the operating stations, constant attention of the machine is not required as these carriers may be quickly loaded and unloaded, leaving ample time for the attendant to perform other duties or to operate several machines. Thus, the assembly operations are carried out quickly and efficiently at a minimum cost.

The modified carrier rotating mechanism shown in Fig. 19 is generally similar to that heretofore described. In this instance, however, a positive driving connection is provided by a flexible chain 81a running over a drive sprocket 82a fast on the shaft 37 and over spaced idler sprockets 83a carried on the frame of the machine. The sprockets 83a are so located that the run of the chain between them is held in operative engagement with sprockets 66a with which the carriers 23 are equipped in lieu of the V-pulleys described hereinbefore. While this mechanism has been shown arranged for rotating the carriers at the first and second operating stations, it will be understood that it may be arranged to rotate carriers at other positions if desired.

It will be apparent from the foregoing that the invention provides a novel and efficient method and apparatus for assembling antifriction bearings. The assembling operation is materially simplified and speeded up by assembling the rollers directly in the race ring thus eliminating numerous manual operations heretofore required. The improved assembling method may be carried out advantageously by the novel apparatus forming a part of the present invention which apparatus is designed to carry out automatically the various steps in the assembly of antifriction bearings. Parts to be assembled are lined up and supplied to the assembling units by automatic feed mechanism of improved construction. The units operate to assemble these parts together into unitary bearing structures with a minimum of attention and manual intervention, thus substantially reducing the costs of assembling the bearings.

I claim as my invention:

1. In a machine for assembling rollers in a bearing race ring, in combination, means for holding the race ring, and means for inserting rollers in said ring one-by-one to form a complete series around the periphery of the ring comprising a member adapted to project into the ring and cooperating therewith to form an annular roller receiving chamber, a duct formed interiorly of said member and terminating in a radial outlet extending through the periphery of said member and through which rollers may be ejected sidewise into said chamber and held positioned in the ring by said member, an element mounted on said member in operative relation to said outlet for movement radially of the bearing ring, and means for moving said element to eject rollers one-by-one into the race ring.

2. In a machine for assembling rollers in a bearing race ring, in combination, means for holding the race ring, and means for inserting the rollers in the race ring to form a complete series around the periphery of the ring comprising an elongated member having an end portion adapted when inserted in the race ring to define an annular roller receiving chamber, a duct extending longitudinally through said member and terminating in an outlet in said end portion opening laterally into said chamber, means for feeding rollers to said duct, a slot formed transversely of said end portion and communicating with said duct rearwardly of said outlet, an ejecting element adapted to be reciprocated in said slot to eject the rollers sidewise one-by-one through said outlet into said chamber, and power operated means for simultaneously reciprocating said ejecting element and effecting relative rotary movement between the race ring and said member.

3. In a roller bearing assembling machine, the combination of a roller feed, a substantially cylindrical hollow assembling pilot arranged to be disposed vertically in a bearing and to have rollers fed thereto to be grouped around the same in the bearing, means for ejecting the rollers laterally from the pilot into the bearing, means for turning said bearing while it is being filled with a circle of rollers, and means for applying a retainer ring onto the bearing to retain the circularly grouped rollers therein.

4. In a roller bearing assembling machine, the combination of a roller feed, a support for a cup-shaped bearing whereon the same is arranged to be held open end up and with the axis thereof substantially vertical, a substantially cylindrical pilot coaxially disposed with respect to a bearing on said support and projecting therein, said pilot having a longitudinal passage provided therein communicating with said roller feed and a longitudinal slot provided in the side thereof extending laterally from said passage, and an ejector movable transversely relative to said pilot toward said slot to discharge rollers from said passage through said slot into the bearing.

5. A machine for assembling rollers in a bearing race ring having, in combination, a chute supporting and advancing a row of rollers in end to end abutting relation with the end roller disposed within said ring approximately parallel to the ring axis, a plunger longer than the diameter of said ring and projecting into the ring at an angle to the plane thereof, and means for reciprocating said plunger intermittently and in an endwise direction, said plunger being operable on its active stroke to engage said end roller and shift it sidewise against the inner periphery of said ring and when retracted permitting the row of rollers to advance endwise.

GEORGE H. CARLSON.